(12) United States Patent
Raichelgauz et al.

(10) Patent No.: US 11,727,056 B2
(45) Date of Patent: Aug. 15, 2023

(54) OBJECT DETECTION BASED ON SHALLOW NEURAL NETWORK THAT PROCESSES INPUT IMAGES

(71) Applicant: Cortica, Ltd., Tel Aviv (IL)

(72) Inventors: Igal Raichelgauz, Tel Aviv (IL); Roi Saida, Acco (IL)

(73) Assignee: Cortica, Ltd., Tel Aviv (IL)

( * ) Notice: Subject to any disclaimer, the term of this patent is extended or adjusted under 35 U.S.C. 154(b) by 309 days.

(21) Appl. No.: 16/835,333

(22) Filed: Mar. 31, 2020

(65) Prior Publication Data

US 2020/0364474 A1 Nov. 19, 2020

Related U.S. Application Data

(60) Provisional application No. 62/827,122, filed on Mar. 31, 2019.

(51) Int. Cl.
*G06V 20/58* (2022.01)
*G06F 16/901* (2019.01)
*G06N 3/08* (2023.01)
*G06N 3/04* (2023.01)
*G06T 11/20* (2006.01)
*G06V 40/10* (2022.01)
*G06F 18/2431* (2023.01)

(52) U.S. Cl.
CPC ........ *G06F 16/901* (2019.01); *G06F 16/9014* (2019.01); *G06F 18/2431* (2023.01); *G06N 3/04* (2013.01); *G06N 3/08* (2013.01); *G06T 11/20* (2013.01); *G06V 20/584* (2022.01); *G06V 40/10* (2022.01); *G06T 2210/12* (2013.01)

(58) Field of Classification Search
CPC ............... G06K 9/4628; G06K 9/6267; G06K 9/00288; G06K 9/00114; G06K 9/00147; G06K 9/3233; G06K 9/46; G06K 9/4609; G06K 9/628; G06K 2209/23; G06K 9/00624; G06T 2207/20084; G06T 2207/20081; G06T 2210/12; G06T 9/002
See application file for complete search history.

(56) References Cited

U.S. PATENT DOCUMENTS 6,640,015 B1 10/2003 Lafruit
7,801,893 B2 9/2010 Gulli et al.
(Continued)

OTHER PUBLICATIONS

Ashraf et al., "Shallow Networks for High-Accuracy Road Object-Detection", 2016, arXiv: 1606.01561v1 [cs.CV] Jun. 5, 2016, pp. 1-9.*

(Continued)

*Primary Examiner* — Guillermo M Rivera-Martinez
(74) *Attorney, Agent, or Firm* — Reches Patents (57) ABSTRACT

A method for driving-related object detection, the method may include receiving an input image by an input of an object detector; and detecting, by an object detector, objects that appear in the input image. The detecting includes searching for (i) a first object having a first size that is within a first size range and belongs to a four wheel vehicle class, (ii) a second object having a second size that is within a second size range and belongs to a subclass out of multiple four wheel vehicle subclasses, (iii) a pedestrian, and (iv) a two wheel vehicle; wherein a maximum of the first size range does not substantially exceed a minimum of the second size range.

30 Claims, 9 Drawing Sheets

(56) References Cited

U.S. PATENT DOCUMENTS

| | | |
|---|---|---|
| 8,275,764 B2 | 9/2012 | Jeon |
| RE44,225 E | 5/2013 | Aviv |
| 8,527,978 B1 | 9/2013 | Sallam |
| 8,634,980 B1 | 1/2014 | Urmson |
| 8,781,152 B2 | 7/2014 | Momeyer |
| 8,782,077 B1 | 7/2014 | Rowley |
| 9,298,763 B1 | 3/2016 | Zack |
| 9,440,647 B1 | 9/2016 | Sucan |
| 9,734,533 B1 | 8/2017 | Givot |
| 10,133,947 B2 | 11/2018 | Yang |
| 10,347,122 B2 | 7/2019 | Takenaka |
| 10,491,885 B1 | 11/2019 | Hicks |
| 2003/0037010 A1 | 2/2003 | Schmelzer |
| 2004/0059736 A1 | 3/2004 | Willse |
| 2004/0091111 A1 | 5/2004 | Levy |
| 2004/0230572 A1 | 11/2004 | Omoigui |
| 2005/0193015 A1 | 9/2005 | Logston |
| 2006/0100987 A1 | 5/2006 | Leurs |
| 2006/0120626 A1 | 6/2006 | Perlmutter |
| 2006/0251339 A1 | 11/2006 | Gokturk |
| 2007/0196013 A1 | 8/2007 | Li |
| 2008/0109433 A1 | 5/2008 | Rose |
| 2008/0152231 A1 | 6/2008 | Gokturk |
| 2008/0166020 A1 | 7/2008 | Kosaka |
| 2008/0270569 A1 | 10/2008 | McBride |
| 2008/0294278 A1 | 11/2008 | Borgeson |
| 2009/0022472 A1 | 1/2009 | Bronstein |
| 2009/0034791 A1 | 2/2009 | Doretto |
| 2009/0043818 A1 | 2/2009 | Raichelgauz |
| 2009/0080759 A1 | 3/2009 | Bhaskar |
| 2009/0216761 A1 | 8/2009 | Raichelgauz |
| 2009/0278934 A1 | 11/2009 | Ecker |
| 2010/0042646 A1 | 2/2010 | Raichelqauz |
| 2010/0082684 A1 | 4/2010 | Churchill |
| 2010/0111408 A1 | 5/2010 | Matsuhira |
| 2010/0306193 A1 | 12/2010 | Pereira |
| 2011/0029620 A1 | 2/2011 | Bonforte |
| 2011/0038545 A1 | 2/2011 | Bober |
| 2011/0246566 A1 | 10/2011 | Kashef |
| 2012/0133497 A1 | 5/2012 | Sasaki |
| 2012/0179751 A1 | 7/2012 | Ahn |
| 2013/0103814 A1 | 4/2013 | Carrasco |
| 2013/0212493 A1 | 8/2013 | Krishnamurthy |
| 2013/0226820 A1 | 8/2013 | Sedota, Jr. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0201330 A1 | 7/2014 | Lozano Lopez |
| 2014/0379477 A1 | 12/2014 | Sheinfeld |
| 2015/0033150 A1 | 1/2015 | Lee |
| 2015/0117784 A1 | 4/2015 | Lin |
| 2015/0134688 A1 | 5/2015 | Jing |
| 2015/0363644 A1 | 12/2015 | Wnuk |
| 2016/0210525 A1 | 7/2016 | Yang |
| 2016/0221592 A1 | 8/2016 | Puttagunta |
| 2016/0342683 A1 | 11/2016 | Kwon |
| 2016/0357188 A1 | 12/2016 | Ansari |
| 2017/0032257 A1 | 2/2017 | Sharifi |
| 2017/0041254 A1 | 2/2017 | Agara Venkatesha Rao |
| 2017/0083792 A1* | 3/2017 | Rodriguez-Serrano ............ G06T 7/10 |
| 2017/0109602 A1 | 4/2017 | Kim |
| 2017/0132472 A1* | 5/2017 | Tao .................. G06N 3/08 |
| 2017/0169315 A1* | 6/2017 | Vaca Castano ...... G06K 9/6814 |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0137406 A1* | 5/2018 | Howard ............ G06N 3/0454 |
| 2018/0137642 A1* | 5/2018 | Malisiewicz ...... G06K 9/00201 |
| 2018/0150684 A1* | 5/2018 | Wang ............... G06K 9/00275 |
| 2018/0157916 A1 | 6/2018 | Doumbouya |
| 2018/0158323 A1 | 6/2018 | Takenaka |
| 2018/0204111 A1 | 7/2018 | Zadeh |
| 2018/0276035 A1 | 9/2018 | Henry ............... G06N 3/0454 |
| 2018/0285682 A1* | 10/2018 | Najibi ............... G06K 9/6289 |
| 2018/0342077 A1* | 11/2018 | Tsuno .............. G06K 9/6256 |
| 2019/0005726 A1 | 1/2019 | Nakano |
| 2019/0019318 A1* | 1/2019 | Cinnamon ............ G06T 7/001 |
| 2019/0026538 A1* | 1/2019 | Wang ................ G06K 9/4642 |
| 2019/0026917 A1* | 1/2019 | Liao .................. G06N 3/0454 |
| 2019/0039627 A1 | 2/2019 | Yamamoto |
| 2019/0043242 A1* | 2/2019 | Risser ................ G06T 11/001 |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0266015 A1* | 8/2019 | Chandra ............. G06F 9/5027 |
| 2019/0317513 A1 | 10/2019 | Zhang |
| 2019/0341052 A1* | 11/2019 | Allibhai ................ G10L 15/22 |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0134833 A1* | 4/2020 | Biswas ................ G06K 9/342 |
| 2020/0043326 A1 | 6/2020 | Tao |
| 2021/0365716 A1* | 11/2021 | Li .......................... H04N 5/247 |

OTHER PUBLICATIONS

Jasinschi et al., "A Probabilistic Layered Framework for Integrating Multimedia Content and Context Information", 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of.

Technology, Neuroinformatics and Cognitive Robotics Lab (Year; 2016).

Chen, Yixin, James Ze Wang, and Robert Krovetz. "Clue: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

OBJECT DETECTION BASED ON SHALLOW NEURAL NETWORK THAT PROCESSES INPUT IMAGES

CROSS REFERENCE

This application claims priority from U.S. provisional patent 62/827,122 filing date Mar. 31, 2019.

BACKGROUND

Object detection is required in various systems and applications.

For example—autonomous vehicles and advanced driver assistance systems (ADAS) may include object detection units that should detect driving related objects such as vehicles and pedestrians.

Some neural network infrastructures may include larger than usual convolutional filters. For example—commonly used convolutional filters have a kernel that include nine elements (three by three). Other neural network infrastructures include convolutional filters that exceed nine elements—for example five by five elements.

The larger than usual convolutional filters may perform more complex operations but they require more computations, are more power consuming and exhibit a larger latency.

There is a growing need to provide an efficient object detection scheme.

SUMMARY

There may be provided a method for object detection, the method may include receiving an input image by an input of an object detector; and detecting, by an object detector, objects that appear in the input image. The detecting may include (i) processing the input image by a shallow neural network to provide a shallow neural network output; and determining, by one or more region units, bounding boxes information, based on the shallow neural network output. The shallow neural network output may include multiple convolutional layers and multiple pooling layers; wherein the multiple convolutional layers may include convolutional filters having a kernel that exceeds nine; wherein an output of a certain convolutional layer has significantly fewer elements that an output of a first convolutional layer of the shallow neural network; wherein the certain convolutional layer may be located at a beginning of the shallow neural network.

The output of the certain convolutional layer has about one half of the elements of the output of the first convolutional layer of the shallow neural network.

The certain convolutional layer may be a second convolutional layer.

A set of last convolutional layers of the shallow neural network output may have an alternating number of convolutional filters.

The outputs of set of last convolutional layers of the shallow neural network may have an alternating number of elements per output.

The multiple convolutional layers may include convolutional filters having a kernel that has at least five by five elements.

A last convolutional layer of the shallow neural network output may be partitioned to different sets of convolutional filters—one set of convolutional filters per object class.

A number of classes may or may not exceed three.

The determining of the bounding boxes information may be performed independently per each class.

The method may include associating with each class a unique set of anchors.

There may be provided a non-transitory computer readable medium for object detection, that stores instructions for receiving an input image by an input of an object detector; and detecting, by an object detector, objects that appear in the input image; wherein the detecting may include processing the input image by a shallow neural network to provide a shallow neural network output; and determining, by one or more region units, bounding boxes information, based on the shallow neural network output; wherein the shallow neural network output may include multiple convolutional layers and multiple pooling layers; wherein the multiple convolutional layers may include convolutional filters having a kernel that exceeds nine; wherein an output of a certain convolutional layer has significantly fewer elements that an output of a first convolutional layer of the shallow neural network; wherein the certain convolutional layer may be located at a beginning of the shallow neural network.

The output of the certain convolutional layer has about one half of the elements of the output of the first convolutional layer of the shallow neural network.

The certain convolutional layer may be a second convolutional layer.

A set of last convolutional layers of the shallow neural network output may have an alternating number of convolutional filters.

The outputs of set of last convolutional layers of the shallow neural network may have an alternating number of elements per output.

The multiple convolutional layers may include convolutional filters having a kernel that has at least five by five elements.

A last convolutional layer of the shallow neural network output may be partitioned to different sets of convolutional filters—one set of convolutional filters per object class.

A number of classes may or may not exceed three.

The determining of the bounding boxes information may be performed independently per each class.

The non-transitory computer readable medium may store instructions for associating with each class a unique set of anchors.

There may be provided an object detector for object detection, the object detector may include an input; a shallow neural network; and one or more region units. The input may be configured to receive an input image. The shallow neural network may be configured to process the input image to provide a shallow neural network output. The one or more region units may be configured to generate bounding boxes information, based on the shallow neural network output. The shallow neural network output may include multiple convolutional layers and multiple pooling layers; wherein the multiple convolutional layers may include convolutional filters having a kernel that exceeds nine; wherein an output of a certain convolutional layer has significantly fewer elements that an output of a first convolutional layer of the shallow neural network; wherein the certain convolutional layer may be located at a beginning of the shallow neural network.

The output of the certain convolutional layer has about one half of the elements of the output of the first convolutional layer of the shallow neural network.

The certain convolutional layer may be a second convolutional layer.

A set of last convolutional layers of the shallow neural network output may have an alternating number of convolutional filters.

The outputs of set of last convolutional layers of the shallow neural network may have an alternating number of elements per output.

The multiple convolutional layers may include convolutional filters having a kernel that has at least five by five elements.

A last convolutional layer of the shallow neural network output may be partitioned to different sets of convolutional filters—one set of convolutional filters per object class.

A number of classes may or may not exceed three.

The determining of the bounding boxes information may be performed independently per each class.

The object detector may be configured to associate with each class a unique set of anchors.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a low power object detector (detector), non-transitory computer readable medium, and method.

Figure 1:
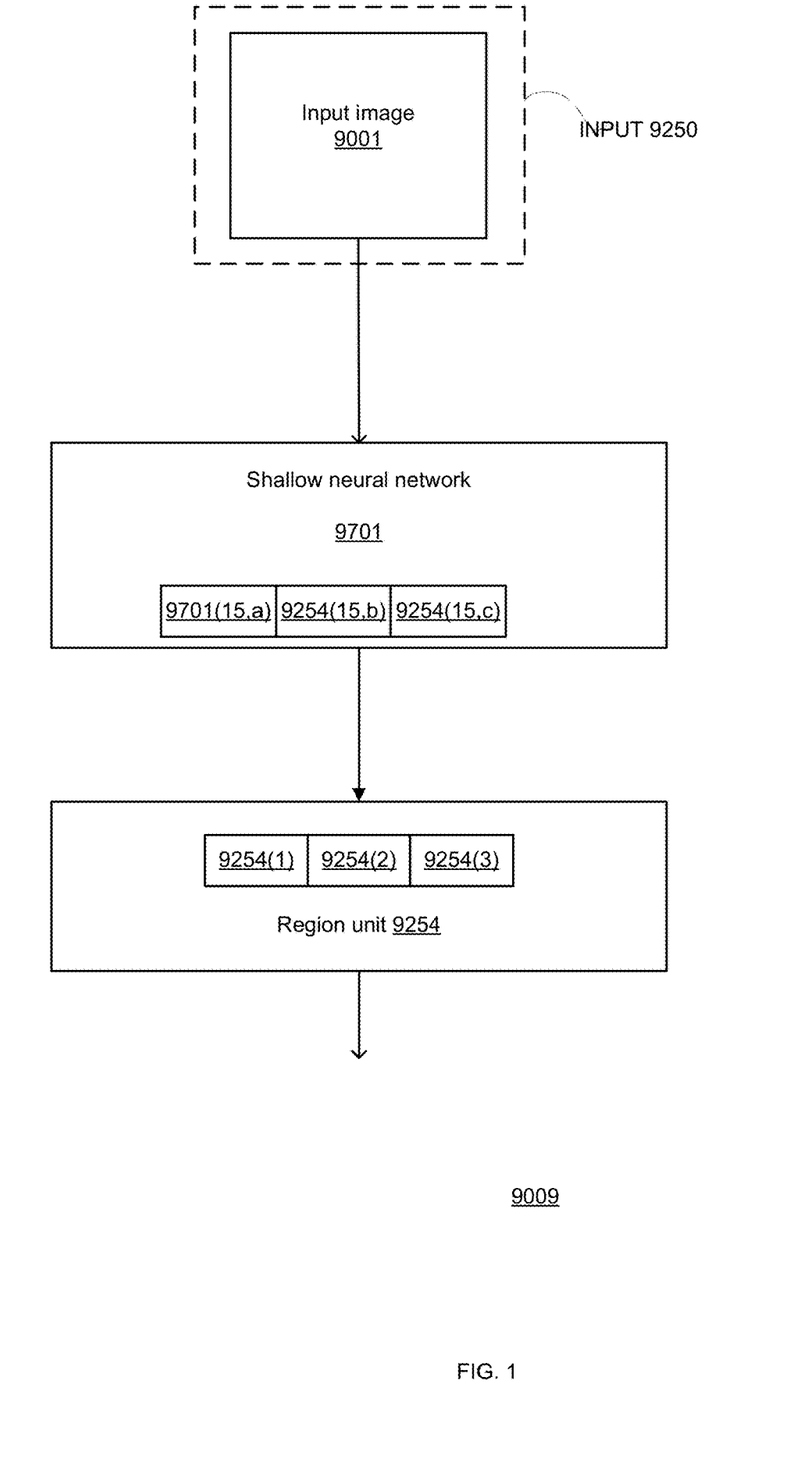
FIG. 1 illustrates an example of an object detector.
Figure 2:
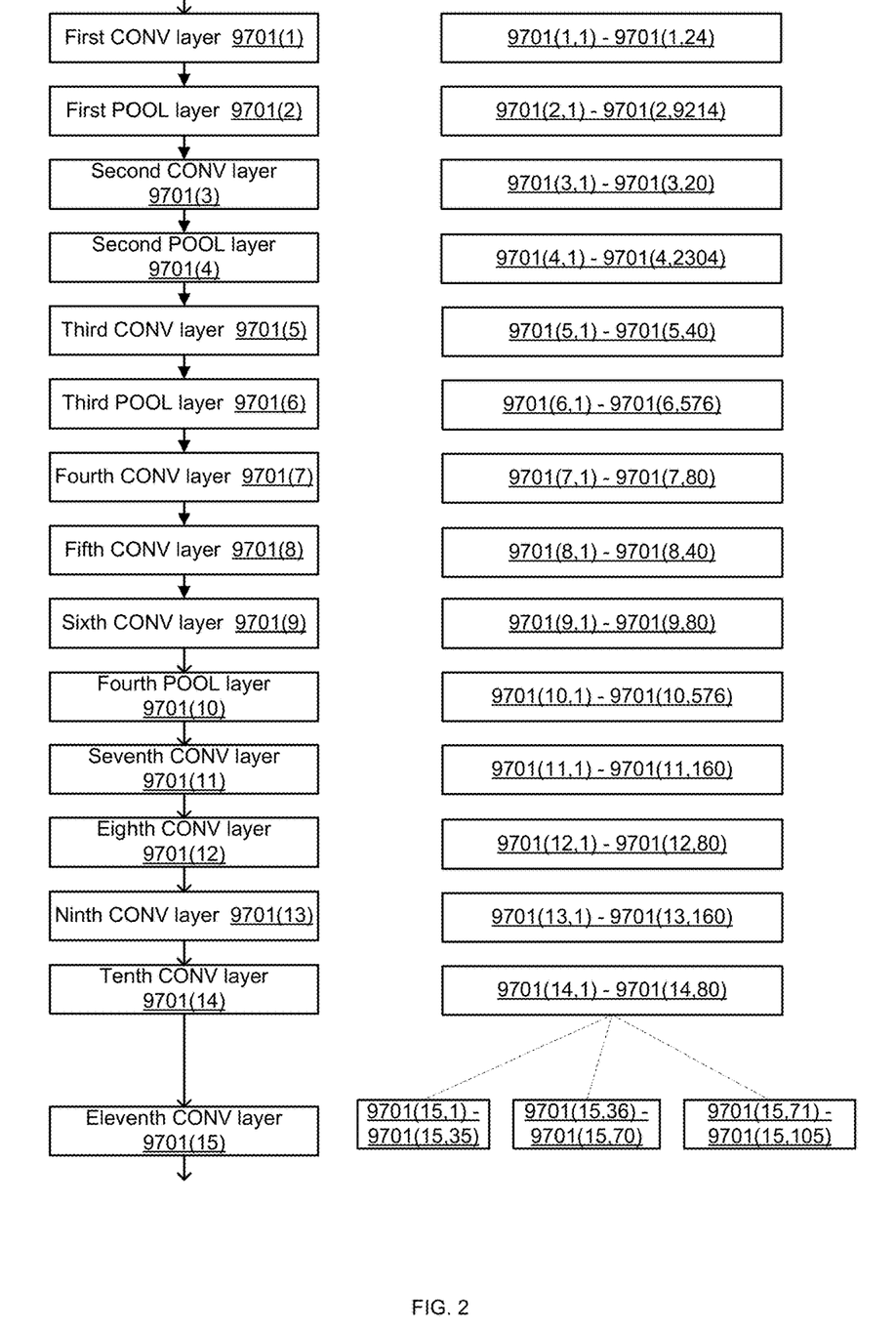
FIG. 2 illustrates an example of a shallow neural network of the object detector.

FIG. 1 illustrates an example of an object detector 9009 and FIG. 2 illustrates an example of a shallow neural network of the object detector.

Object detector 9009 may include input 9001, a shallow neural network 9701 and one or more region units 9254.

The input 9010 may be configured to receive an input image.

The shallow neural network 9701 may be configured to process the input image to provide a shallow neural network output. The shallow neural network output may provide indications about objects located within an input image. The shallow neural network may output features regarding segments of the image.

The one or more region units 9254 may be configured to generate bounding boxes information, based on the shallow neural network output. The bounding boxes information may be YOLO compliant or non-YOLO compliant.

The shallow neural network output may include multiple convolutional layers and multiple pooling layers.

The multiple convolutional layers may include convolutional filters having a kernel that exceeds nine. For example—convolutional filter having a kernel that include five by five elements.

In order to reduce the size, power consumption of the shallow neural network, one of the first convolutional layers (referred to as a certain convolutional layer) is smaller than a conventional convolution layer in the sense that it has significantly fewer (for example—20%, 30%, 50% less) elements that an output of a first convolutional layer of the shallow neural network; wherein the certain convolutional layer may be located at a beginning of the shallow neural network.

Providing a reduced convolutional layer at the beginning of the shallow neural network may contribute to a decrement in the size of the shallow neural network—as the reduction is also reflected in the layers that follow the certain convolutional layer.

In FIG. 2 the certain convolutional layer may is a second convolutional layer. It should be noted that another convolutional layer may be the certain convolutional layer.

A set of last convolutional layers of the shallow neural network output may have an alternating number of convolutional filters. The set of last convolutional layers may include the last four layers. In FIG. 2 the set includes the seventh, eighth, ninth and tenth convolutional layers.

Another set of intermediate convolutional layers of the shallow neural network output may have an alternating number of convolutional filters. The other set of intermediate convolutional layers may include three layers. In FIG. 2 the other set includes the fourth fifth and sixth convolutional layers.

In each set—the number floating point operations consumed by larger layers filters is the same as the number of floating point operations consumed by the smaller layers because the number of channels inputted to a larger layer is reduced by the previous smaller layer. This approach effectively reduces the number of operations and parameters of the network.

A last convolutional layer of the shallow neural network is partitioned to different sets of convolutional filters 9701(*a*), 9701(*b*) and 9701(*c*)—one set of convolutional filters per object class. This partition is very effective when the number of classes is small—for example 2, 3 or 4.

Each set is allocated per class and calculated (directly) the possibility that a certain object belongs to the class associated with the set—and this eliminates the need to apply a highly power and computational resource consuming softmax operation (at the last convolutional layer) which requires to calculate multiple dependent probabilities.

In addition—the region unit 9254 calculate the bounding boxes separately for each class—see region subunits 9254(1), 9254(2) and 9254(3)—which may further optimize the object detection per class. This may include associate with each class a unique set of anchors.

Thus—the output signals of first set of convolutional filters 9701(*a*) are fed to first region subunit 9254(1), the output signals of second set of convolutional filters 9701(*b*) are fed to second region subunit 9254(2), and the output signals of third set of convolutional filters 9701(*c*) are fed to third region subunit 9254(3).

The different classes may include four wheel vehicles, two wheel vehicles and a pedestrian. The classes may include sub-classes and the classification (including the learning process) may be based on size of the object.

FIG. 2 illustrates an example of a shallow neural network 9701 that includes various layers.

All convolutional layers have convolutional filters of five by five elements. The filters are one pixel apart from each other.

All pooling layers have two by two maxpool filters. The filters are two pixels apart from each other.

The sequence layers includes layers 9701(1)-9701(15), wherein the convolutional layers are denoted CONV layer. The number of filters per layer is indicated by the boxes located to the right of the convolutional layers. For example—the first CONV layer 9701(1) includes twenty four convolutional filters 9701(1,1)-9701(1,24) and the first POOL layer 9701(2) includes 196 by 196 two by two max pooling filters 9701(2,1)-9701(2,9214).

First CONV layer 192×192×3→192×192×24 (input of 192×192×3 output of 192×192×24)
First POOL layer 192×192×24→96×96×24
Second CONV layer 96×96×24→96×96×20 (20 instead of 48).
Second POOL layer 96×96×20→48×48×2
Third CONV layer 48×48×20→48×48×4
Third POOL layer 48×48×40→24×24×4
Fourth CONV layer 24×24×40→24×24×8
Fifth CONV layer 24×24×80→24×24×40
Sixth CONV layer 24×24×40→24×24×8
Fourth POOL layer 24×24×80→12×12×8
Seventh CONV layer 12×12×80→12×12×16
Eighth CONV layer 12×12×160→12×12×8
Ninth CONV layer 12×12×80→12×12×16
Tenth CONV layer 12×12×160→12×12×8
Eleventh CONV layer 12×12×80→12×12×105 (three sets of 12×12×35 per class).

Figure 3:
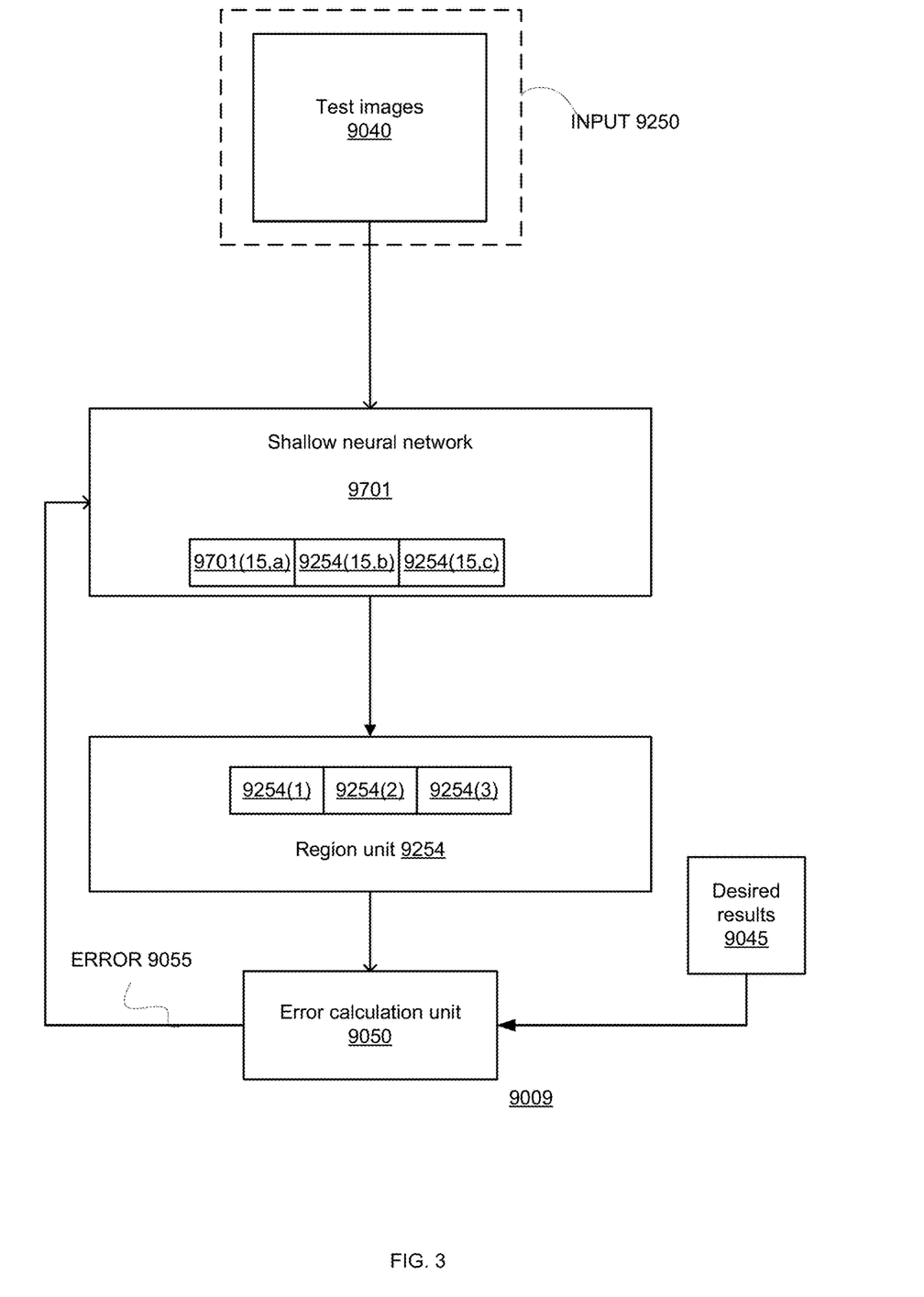
FIG. 3 illustrates an example of a training process.

FIG. 3 illustrates a training process of shallow neural network 9701.

Test images 9040 are fed to shallow neural network 9701 that outputs, for each test image, a shallow neural network output that may be a tensor with multiple features per segment of the test image. The region unit 9254 is configured to receive the output from shallow neural network 9701 and calculate and output candidate bounding boxes per test image. Actual results such as the output candidate bounding boxes per test image may be fed to error calculation unit 9050.

Error calculation unit 9050 also receives desired results 9045—objects that are tagged in advance as including objects.

Error calculation unit 9050 calculates an error 9055 between the actual results and the desired results- and the error is fed to the shallow neural network 9701 during the training process.

It should be noted that in addition to the mentioned above training—the shallow neural network 9701 may be trained to reject (not detect) objects that are too big—for example outside the first and second size ranges.

This may require to train the shallow neural network 9701 not to detect said objects.

The illustrated below size based classifying, applied by the shallow neural network is very efficient and further reduces the energy consumption of the shallow neural network.

Size Based Classification

This may include tagging of relatively small four wheel vehicles by classifying (during the training process) objects that are relatively small (appear small in an input image)—within a first size range to a general class of four wheel vehicles.

Larger four wheel vehicle may be classified more accurately to subclasses such as car, bur, truck, van and the like. Other classes (used for at least classifying small objects) include, for example two wheel vehicles and pedestrians.

Each of these other classes may also include subclasses that may be applied to objects that are larger and can be accurately tagged (during the training process) to finer subclasses.

This size based classification increases the accuracy of the reference information received during the training, improves the accuracy of the training process, improves the accuracy of the object detection and also prevents the training process to spend too much resources on attempting to differentiate between insignificant differences. This also provides an object detector that is fine tunes to differentiate between difference that are significant.

After the completion of the training process the object detector it set to detect in an accurate manner the objects according to their size and classes or sub-classes.

Figure 4:
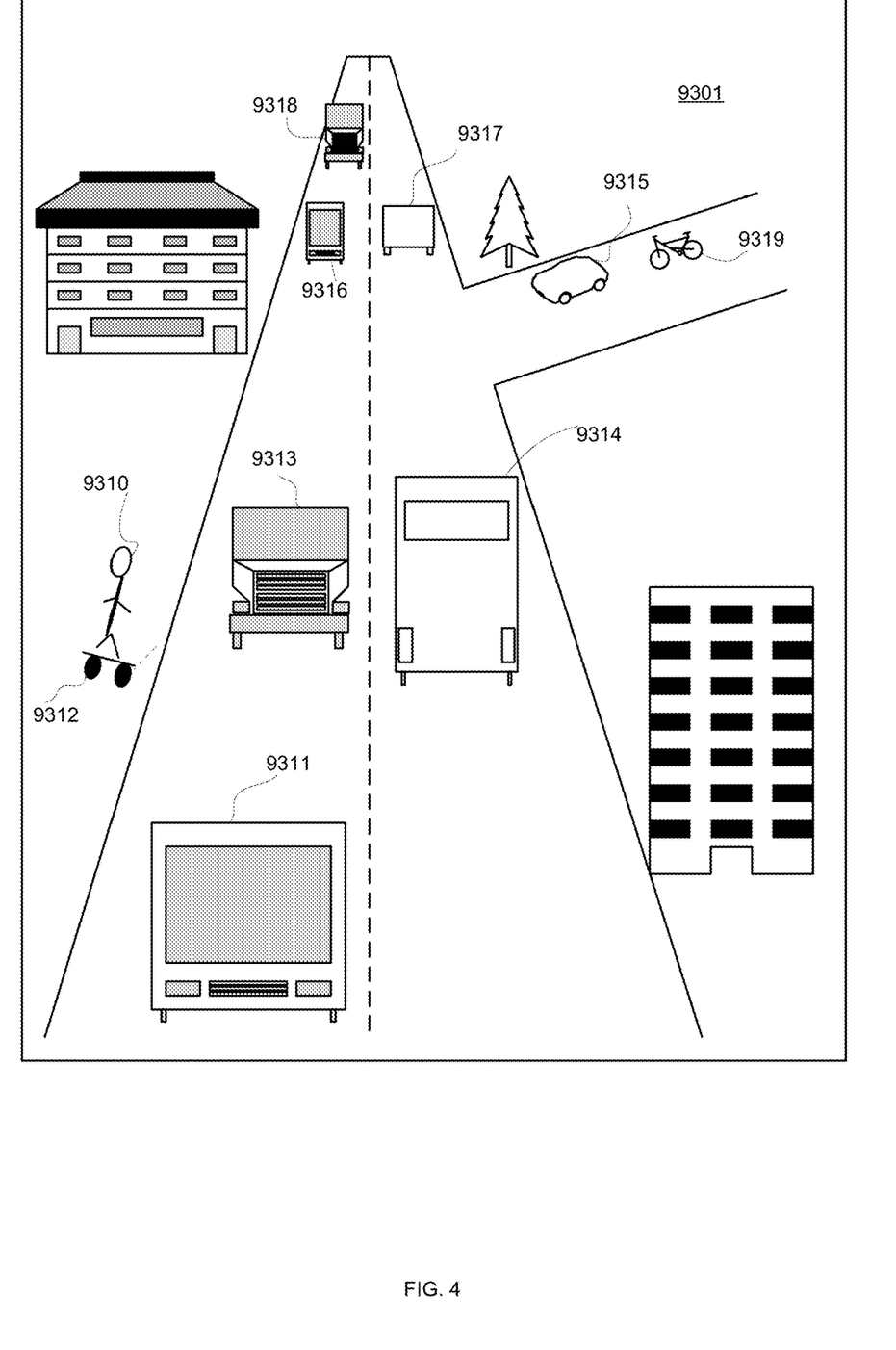
FIG. 4 illustrates an example of an image.

FIG. 4 is an example of an image 9301 that includes first bus 9311, second bus 9314, third bus 9316, first truck 9313, second truck 9317, third truck 9318, first car 9315, first bicycle 9319, and first foot scooter 9312.

Figure 5:
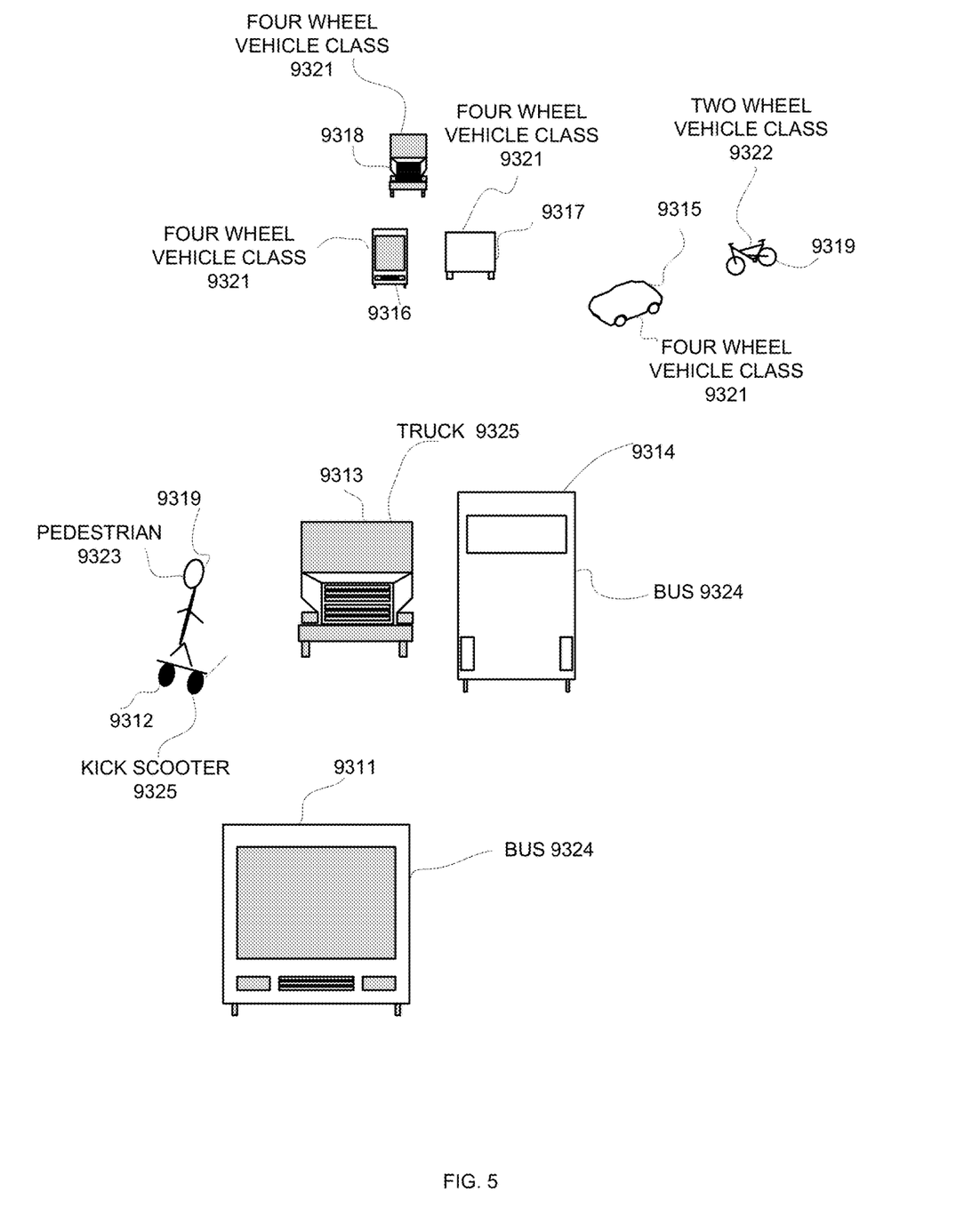
FIG. 5 illustrates an example of a classification of some of the objects that appear in the image.

FIG. 5 illustrates the tagging of the objects of image 9301. The tagging may be included in a reference information used to train the object detector or may be the outcome of the object detection process.

Third bus 9316, second truck 9317, third truck 9318, first car 9315 and first bicycle 9319 are too small (for example have a size within a first size range) and therefore are tagged to classes and not to subclasses.

Third bus 9316, second truck 9317, third truck 9318, first car 9315 are regarded as belonging to a four wheel vehicles class 9321.

The first bicycle 9319 is tagged to belonging to a two wheel vehicle class 9322.

First bus 9311 is large enough (has a size within a second size range) to be tagged as a truck 9325. First bus 9311 and second bus 9314 are large enough (has a size within a second size range) to be tagged as a bus. First foot scooter 9312 is large enough (has a size within a second size range) to be tagged as a foot scooter 9325.

Figure 6:
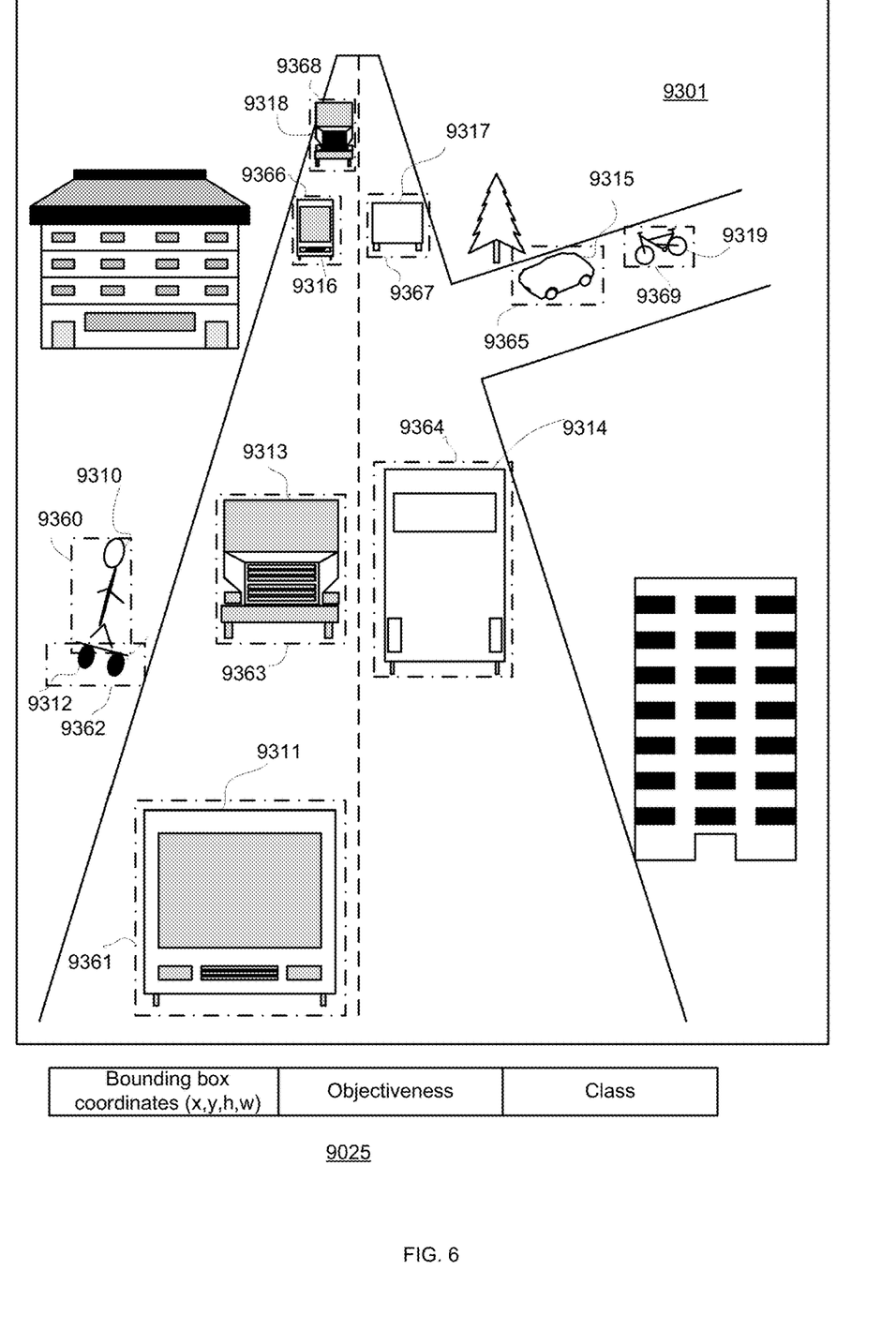
FIG. 6 illustrates an example of the image of FIG. 3 with bounding boxes that surround some of the objects that appear in the image.

FIG. 6 illustrates an example of a possible output of the object detector—bounding boxes 9310, 9311, 9312, 9313, 9314, 9315, 9316, 9317, 9318 and 9319 that surround pedestrian 9310, first bus 9311, foot scooter 9312, first truck 9313, second bus 9314, first car 9315, third bus 9316, second truck 9317, third truck 9318, first bicycle 9319, respectively.

Each bounding is represented by information 9025 that may include coordinates (x,y,h,w) of the bounding boxes, objectiveness and class. The coordinate indicate the location (x,y) as well as the height and width of the bounding boxes. Objectiveness provides a confidence level that an object exists. Class—class of object—as illustrated above). The (x,y) coordinates may represent the center of the bounding box.

The object detection may be compliant to any flavor of YOLO—but other object detection schemes may be applied.

FIG. 5 illustrates an object detector 9000" and FIG. 6 illustrates a training process of the object detector.

Object detector 9000" may include an input 9250, a shallow neural network 9701 and a region unit 9254.

The region unit 9254 follows the shallow neural network 9701.

Input 9250 may be configured to receive an input image 9001.

The shallow neural network 9701 and the region unit 9254 may be configured to cooperate (both participate in the object detection process—the region unit processed the output of the shallow neural network) and detect objects that appear in the input image.

The detecting of the object may include may include searching for (i) a first object having a first size that may be within a first size range and belongs to a four wheel vehicle class, (ii) a second object having a second size that may be within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The shallow neural network 9701 may include convolutional and spooling layers.

The convolutional layers may include convolutional filters. The convolutional filters may be of any shape and size—for example be five by five convolutional filters (have a kernel of five by five elements), be a three by three convolutional filters (have a kernel of three by three elements), and the like.

Figure 8:
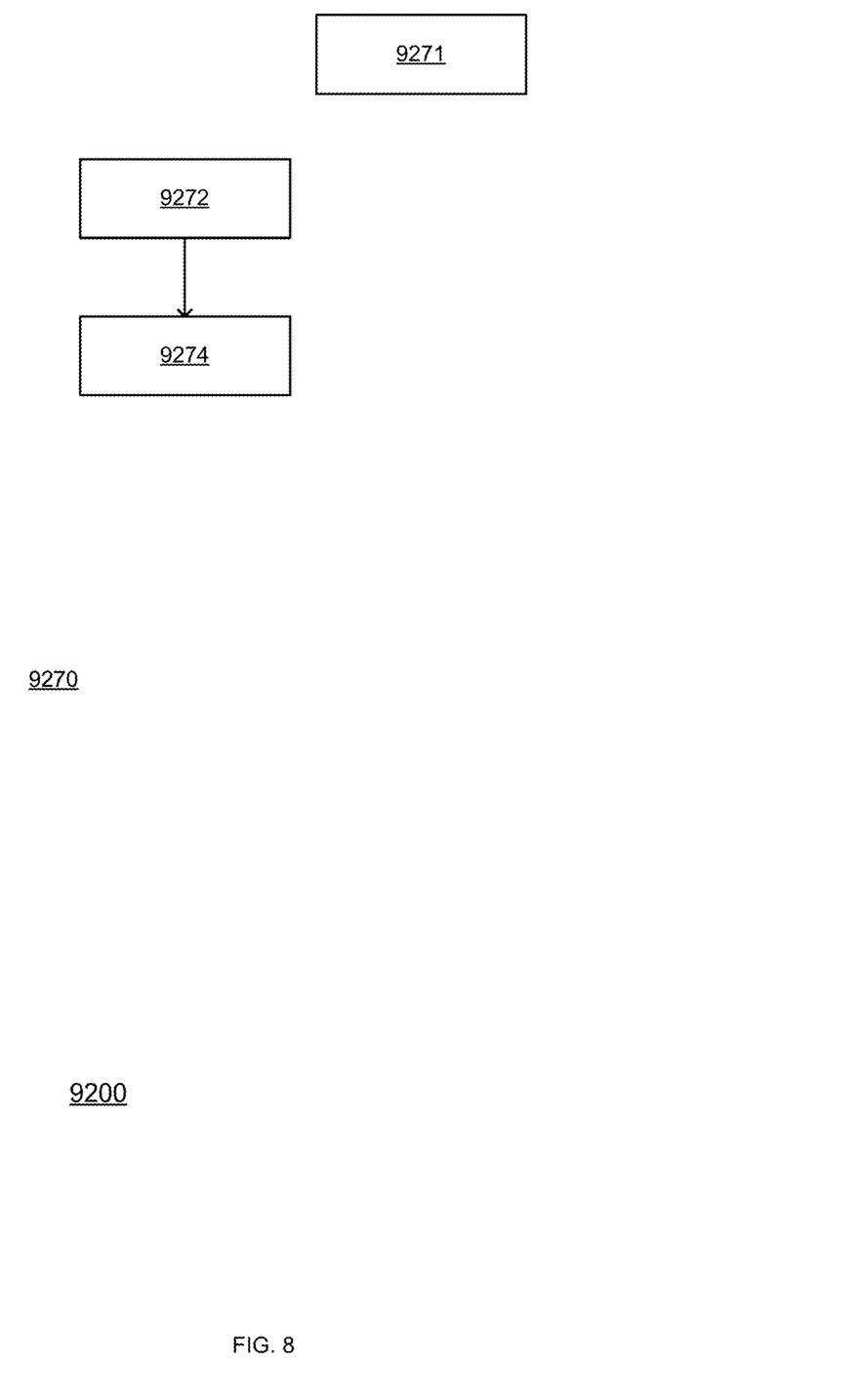
FIG. 8 illustrates an example of a method.

Object detector 9000" may be configured to execute method 9270.

The region unit may include a dedicated section for each one out of the four wheel vehicle class, the two wheel vehicle and the pedestrian. This will improve the detection per each class of objects.

At least a part of the object detector may be a processing circuitry that may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

At least a part of the object detector may be application implemented in hardware, firmware, or software that may be executed by a processing circuitry.

Figure 7:
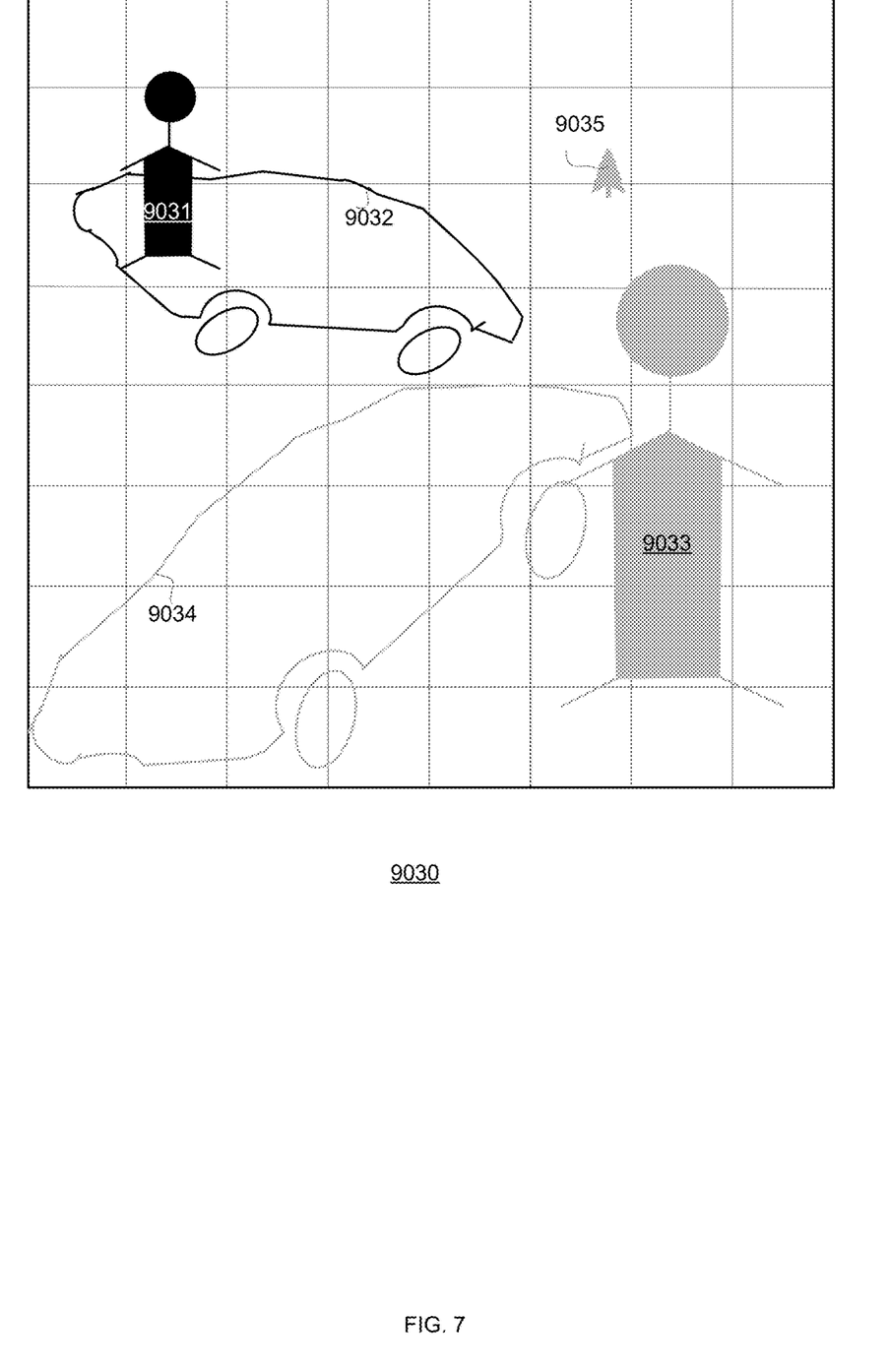
FIG. 7 illustrates an example of an image, two objects, two bounding boxes and a bounding box output.

FIG. 7 illustrates various objects such as 9031, 9032, 9033 and 9034.

Objects 9033 and 9034 are too big and should be ignored of.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

FIG. 8 illustrates method 9270 for driving-related object detection.

Method 9270 may include the steps of:

Step 9272 of receiving an input image by an input of an object detector.

Step 9274 of detecting, by an object detector, objects that appear in the input image.

Step 9272 may include searching for (i) a first object having a first size that is within a first size range and belongs to a four wheel vehicle class, (ii) a second object having a second size that is within a second size range and belongs to a subclass out of multiple four wheel vehicle subclasses, (iii) a pedestrian, and (iv) a two wheel vehicle; wherein a maximum of the first size range does not substantially exceed a minimum of the second size range.

The object detector may be trained to perform said search (and method 9270 may include the training—step 9271) by feeding the object detector with images of objects that are tagged according to the searched objects (i) till (iv). The object detector may be also trained to reject objects that are too big and. The training includes feeding the object detector with images that include objects of at least one of the four types (i)-(iv), generating reference information that tags the objects according the searched types, calculating an error between the outcome of the object detector and the reference information and feeding the error to the object detector.

The subclasses of the four wheel vehicle class may include at least some of the following car, truck, bus, van and the like. The subclasses may include or may be further partitioned to certain type of vehicle, model, and the like.

Accordingly—the classification system may include two layers (single class and single layer of subclasses) or even more layer—to provide a hierarchical classification system that may include more than two layers. For example—a first layer includes a four wheel vehicle, the second layer (subclasses) include car, bus, truck, van and the third layer may include a manufacturer, yet a fourth layer may include model, and the like.

The class of pedestrians and/or the class of two wheel vehicles can also include subclasses to include two or more layers.

Each one of the four wheel vehicle class, at least some of the multiple four wheel vehicle subclasses, may have has a unique set of anchors. The unique sets of anchors may be selected based on the expected shape of the objects that belong to the class and/or the subclass.

Each one of the four wheel vehicle class, two wheel vehicle and the pedestrian has a unique set of anchors.

Anchors may be regarded as initial templates of bounding boxes and using different anchors to different classes may reduce the computational resources, speed the detection and increase the accuracy of the bounding boxes when the different anchors are selected according to the expected shapes of the different vehicles. For example, in a side view, a bus appears longer and higher than a private car. Yet for another example a pedestrian may require bounding boxes that have a height that exceeds their width—while trucks (for example in side view) may require bounding boxes that have a height that is smaller than their width.

Figure 9:
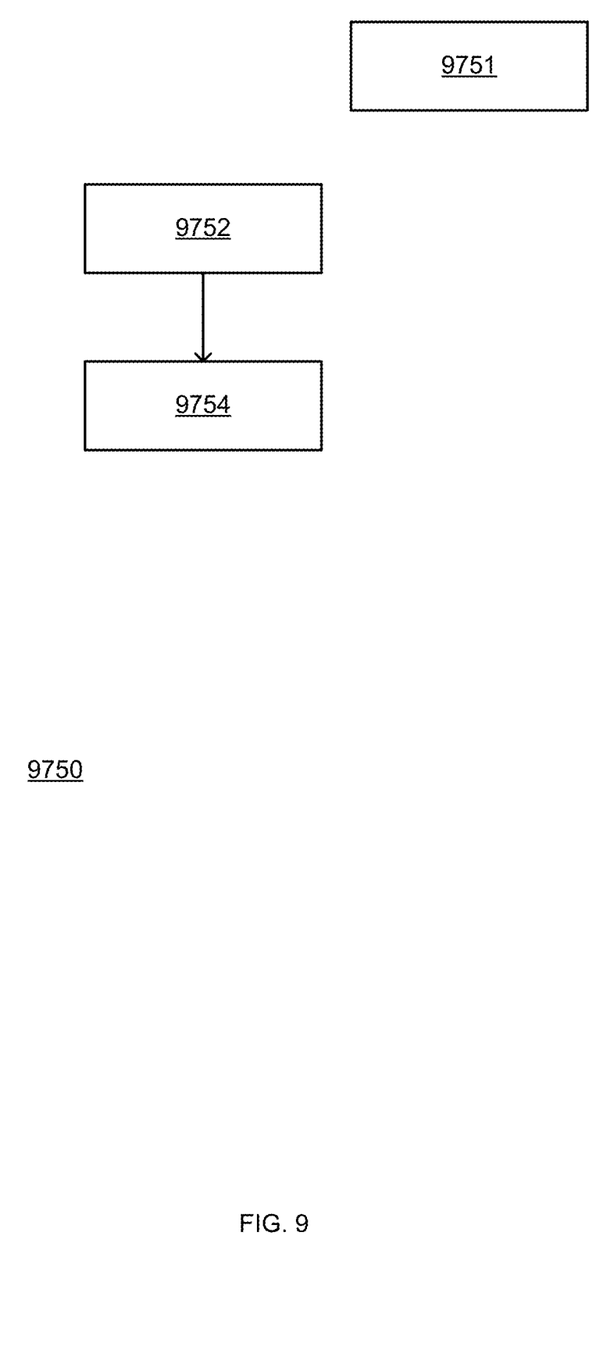
FIG. 9 illustrates an example of a method.

FIG. 9 illustrates method 9750 for object detection.

Method 9750 may include:

Step 9752 of receiving an input image by an input of an object detector.

Step 9754 of detecting, by an object detector, objects that appear in the input image.

Step 9754 may include (i) processing the input image by a shallow neural network to provide a shallow neural network output; and (ii) determining, by one or more region units, bounding boxes information, based on the shallow neural network output.

The shallow neural network output may include multiple convolutional layers and multiple pooling layers; wherein the multiple convolutional layers may include convolutional filters having a kernel that exceeds nine; wherein an output of a certain convolutional layer has significantly fewer elements that an output of a first convolutional layer of the shallow neural network; wherein the certain convolutional layer may be located at a beginning of the shallow neural network.

The output of the certain convolutional layer has about one half of the elements of the output of the first convolutional layer of the shallow neural network.

The certain convolutional layer may be a second convolutional layer.

A set of last convolutional layers of the shallow neural network output may have an alternating number of convolutional filters.

The outputs of set of last convolutional layers of the shallow neural network may have an alternating number of elements per output.

The multiple convolutional layers may include convolutional filters having a kernel that has at least five by five elements.

A last convolutional layer of the shallow neural network output may be partitioned to different sets of convolutional filters—one set of convolutional filters per object class.

A number of classes may or may not exceed three.

The determining of the bounding boxes information may be performed independently per each class.

The method may include associating with each class a unique set of anchors.

Method 9750 may include training 9751 the shallow neural network.

There may be provided an extremely efficient architecture, which may be designed especially for low computer devices such as but not limited to 16 bits fixed point devices like Renesas AI chips.

Experiments on BDD, Caltech, CBD and Continental object detection datasets demonstrate the superior quality of solution while running in 15 frames per second on Renesas hardware. Experiments have demonstrated that the suggested architecture detects objects accurately and meet the real-time requirements on Renesas.

Pursuing the best accuracy in very limited computational budgets the suggested solution may have the following benefits:

A new output layer of the shallow neural network eliminates the costly softmax operation on Renesas platform.

Assigning for each class separated localization kernels. This separation eliminates competition between different classes to set different localization functions. In addition, the separation significantly improves the detection quality.

Using a class called 4-wheels that includes: Cars, Vans, Trucks, and Buses. That definition simplifies the training process as it overlook the tag mistakes between the different types of 4-wheels, those errors confuse the training process and make it more difficult to convergence. In addition—the distinguish between Bus and truck demands more operations and the increasing of the model size regardless of the quality of the ground truth. This separation is more problematic when objects become too small. Therefore if there is no requirement to separate between the different types of 4-wheels we can group all 4-wheels together and as a result minimize the required network resources.

For the same proposes we define a hyper-class called 2-wheels that group together: bicycle and motorbike.

The region unit—for each shallow detector, we associate a single detection layer processing the output of the last convolution layer.

The region unit (detection layer) may rely on a dense anchoring scheme, where anchors are sampled uniformly over the spatial domain with a predefined set of scales and aspect ratios.

Every location in a feature map may be associated with k anchors with predefined scales and aspect ratios.

There are three classes- and each class may have its own anchors (for example seven).

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for object detection, the method comprises:
receiving an input image by an input of an object detector; and
detecting, by the object detector, objects that appear in the input image; wherein the detecting comprises:
processing the input image by a shallow neural network to provide a shallow neural network output; and
determining, by one or more region units, bounding boxes information related to bounding boxes that surround at least some of the objects that appear in the input image, based on the shallow neural network output;
wherein for each one of the bounding boxes, the bounding box information comprises coordinates of the bounding box, objectiveness of the bounding box and a class of an object that is surrounded by the bounding box; wherein the coordinates indicate a location, a height and a width of the bounding box; and wherein the objectiveness provides a confidence level that the object exist;
wherein the shallow neural network output comprises multiple convolutional layers and multiple pooling layers; wherein the multiple convolutional layers comprise convolutional filters having a kernel that has more than nine elements;
wherein an output of a certain convolutional layer that is located at a beginning of the shallow neural network has significantly fewer elements than an output of the first convolutional layer of the shallow neural network.

2. The method according to claim 1 wherein the output of the certain convolutional layer has about one half of the elements of the output of the first convolutional layer of the shallow neural network.

3. The method according to claim 1 wherein the certain convolutional layer is a second convolutional layer.

4. The method according to claim 1 wherein a set of last convolutional layers of the shallow neural network output have an alternating number of convolutional filters.

5. The method according to claim 1 wherein outputs of a set of last convolutional layers of the shallow neural network have an alternating number of elements per output.

6. The method according to claim 1 wherein the multiple convolutional layers comprise convolutional filters having a kernel that has at least five by five elements.

7. The method according to claim 1 wherein a last convolutional layer of the shallow neural network output is partitioned to different sets of convolutional filters, wherein the different sets of the convolutional filters include one set of convolutional filters per object class.

8. The method according to claim 7 wherein there are up to four object classes.

9. The method according to claim 7 wherein the determining of the bounding boxes information is performed independently per each object class.

10. The method according to claim 7 comprises associating with each object class a unique set of anchors based on an expected shape of objects used as initial templates of the bounding boxes.

11. A non-transitory computer readable medium for object detection, that stores instructions for:
receiving an input image by an input of an object detector; and
detecting, by the object detector, objects that appear in the input image; wherein the detecting comprises:
processing the input image by a shallow neural network to provide a shallow neural network output; and
determining, by one or more region units, bounding boxes information related to bounding boxes that surround at least some of the objects that appear in the input image, based on the shallow neural network output;
wherein for each one of the bounding boxes, the bounding box information comprises coordinates of the bounding box, objectiveness of the bounding box and a class of an object that is surrounded by the bounding box; wherein the coordinates indicate a location, a height and a width of the bounding box; and wherein the objectiveness provides a confidence level that the object exist;
wherein the shallow neural network output comprises multiple convolutional layers and multiple pooling layers; wherein the multiple convolutional layers comprise convolutional filters having a kernel that has more than nine elements; wherein an output of a certain convolutional layer that is located at a beginning of the shallow neural network has significantly fewer elements than an output of the first convolutional layer of the shallow neural network.

12. The non-transitory computer readable medium according to claim 11 wherein the output of the certain convolutional layer has about one half of the elements of the output of the first convolutional layer of the shallow neural network.

13. The non-transitory computer readable medium according to claim 11 wherein the certain convolutional layer is a second convolutional layer.

14. The non-transitory computer readable medium according to claim 11 wherein a set of last convolutional layers of the shallow neural network output have an alternating number of convolutional filters.

15. The non-transitory computer readable medium according to claim 11 wherein outputs of a set of last convolutional layers of the shallow neural network have an alternating number of elements per output.

16. The non-transitory computer readable medium according to claim 11 wherein the multiple convolutional layers comprise convolutional filters having a kernel that has at least five by five elements.

17. The non-transitory computer readable medium according to claim 11 wherein a last convolutional layer of the shallow neural network output is partitioned to different sets of convolutional filters, wherein the different sets of the convolutional filters include one set of convolutional filters per object class.

18. The non-transitory computer readable medium according to claim 17 wherein there are up to four object classes.

19. The non-transitory computer readable medium according to claim 17 wherein the determining of the bounding boxes information is performed independently per each object class.

20. The non-transitory computer readable medium according to claim 17 that stores instructions for associating with each object class a unique set of anchors based on an expected shape of objects used as initial templates of the bounding boxes.

21. A object detector for object detection, the object detector comprises:
an input;
a shallow neural network; and
one or more region units;
wherein the input is configured to receive an input image;
wherein the shallow neural network is configured to process the input image to provide a shallow neural network output;
wherein the one or more region units are configured to generate bounding boxes information related to bounding boxes that surround at least some of the objects that appear in the input image, based on the shallow neural network output;
wherein for each one of the bounding boxes, the bounding box information comprises coordinates of the bounding box, objectiveness of the bounding box and a class of an object that is surrounded by the bounding box; wherein the coordinates indicate a location, a height and a width of the bounding box; and wherein the objectiveness provides a confidence level that the object exist;
wherein the shallow neural network output comprises multiple convolutional layers and multiple pooling layers; wherein the multiple convolutional layers comprise convolutional filters having a kernel that has more than nine elements; wherein an output of a certain convolutional layer that is located at a beginning of the shallow neural network has significantly fewer elements than an output of the first convolutional layer of the shallow neural network.

22. The object detector according to claim 21 wherein the output of the certain convolutional layer has about one half of the elements of the output of the first convolutional layer of the shallow neural network.

23. The object detector according to claim 21 wherein the certain convolutional layer is a second convolutional layer.

24. The object detector according to claim 21 wherein a set of last convolutional layers of the shallow neural network output have an alternating number of convolutional filters.

25. The object detector according to claim 21 wherein outputs of a set of last convolutional layers of the shallow neural network have an alternating number of elements per output.

26. The object detector according to claim 21 wherein the multiple convolutional layers comprise convolutional filters having a kernel that has at least five by five elements.

27. The object detector according to claim 21 wherein a last convolutional layer of the shallow neural network output is partitioned to different sets of convolutional filters, wherein the different sets of the convolutional filters include one set of convolutional filters per object class.

28. The object detector according to claim 27 wherein there are up to four object classes.

29. The object detector according to claim 27 wherein the determining of the bounding boxes information is performed independently per each object class.

30. The object detector according to claim 27 that is configured to associate with each object class a unique set of anchors based on an expected shape of objects used as initial templates of the bounding boxes.

* * * * *